United States Patent

Burns

[15] 3,642,616
[45] Feb. 15, 1972

[54] CONTINUOUS METHOD FOR TREATING LIQUIDS

[72] Inventor: William C. Burns, Fullerton, Calif.

[73] Assignee: Water Treatment Corporation, City of Industry, Calif.

[22] Filed: Aug. 16, 1968

[21] Appl. No.: 753,160

[52] U.S. Cl. ............................................210/32, 210/264
[51] Int. Cl. ......................................B01d 15/06, C02b 1/76
[58] Field of Search........................210/33, 30, 32, 34, 35, 38, 210/264, 189

[56] References Cited

UNITED STATES PATENTS

| | | | |
|---|---|---|---|
| 2,355,815 | 8/1944 | McGill | 210/191 X |
| 2,973,319 | 2/1961 | Porter | 210/33 |
| 3,154,484 | 10/1964 | Stoner | 210/35 |
| 3,248,278 | 4/1966 | Wilson | 210/38 X |
| 3,378,339 | 4/1968 | Yamashiki | 210/38 X |
| 2,716,113 | 8/1955 | Axe | 210/264 X |

FOREIGN PATENTS OR APPLICATIONS

| | | | |
|---|---|---|---|
| 987,021 | 3/1965 | Great Britain | 210/33 |

Primary Examiner—Reuben Friedman
Assistant Examiner—Thomas G. Wise
Attorney—Miketta, Glenny, Poms and Smith

[57] ABSTRACT

A continuous method for producing treated water by utilizing at least three zones containing ion-exchange material in which one zone is utilized as a treating or deionization unit, another zone is utilized for regenerating exhausted ion-exchange material and a third zone is utilized for rinsing the regeneration solution from the ion-exchange material, all three zones being operated simultaneously, and when the ion-exchange material in the deionization zone is exhausted the influent water is then transferred to the rinsing zone and the ion-exchange material in the original deionization zone is then regenerated with a regeneration solution while the ion-exchange material in the original regeneration zone is rinsed. Preferably the rinsing operation is conducted by passing a portion of the deionized water through the regenerated ion-exchange material to rinse the salt solution therefrom. It is also preferred to deionize the water by passing the influent water upwardly through the ion-exchange material and to regenerate the ion-exchange material by passing regeneration solution downwardly through said material. Moreover, very good results are obtained if each zone has a freeboard sufficient to allow for expansion of the ion-exchange material and the water to be treated is passed through the ion-exchange material at a flow rate sufficient to force and hold the ion-exchange material against the top of the zone and in the freeboard space, thereby preventing said ion-exchange material from being mixed.

7 Claims, 1 Drawing Figure

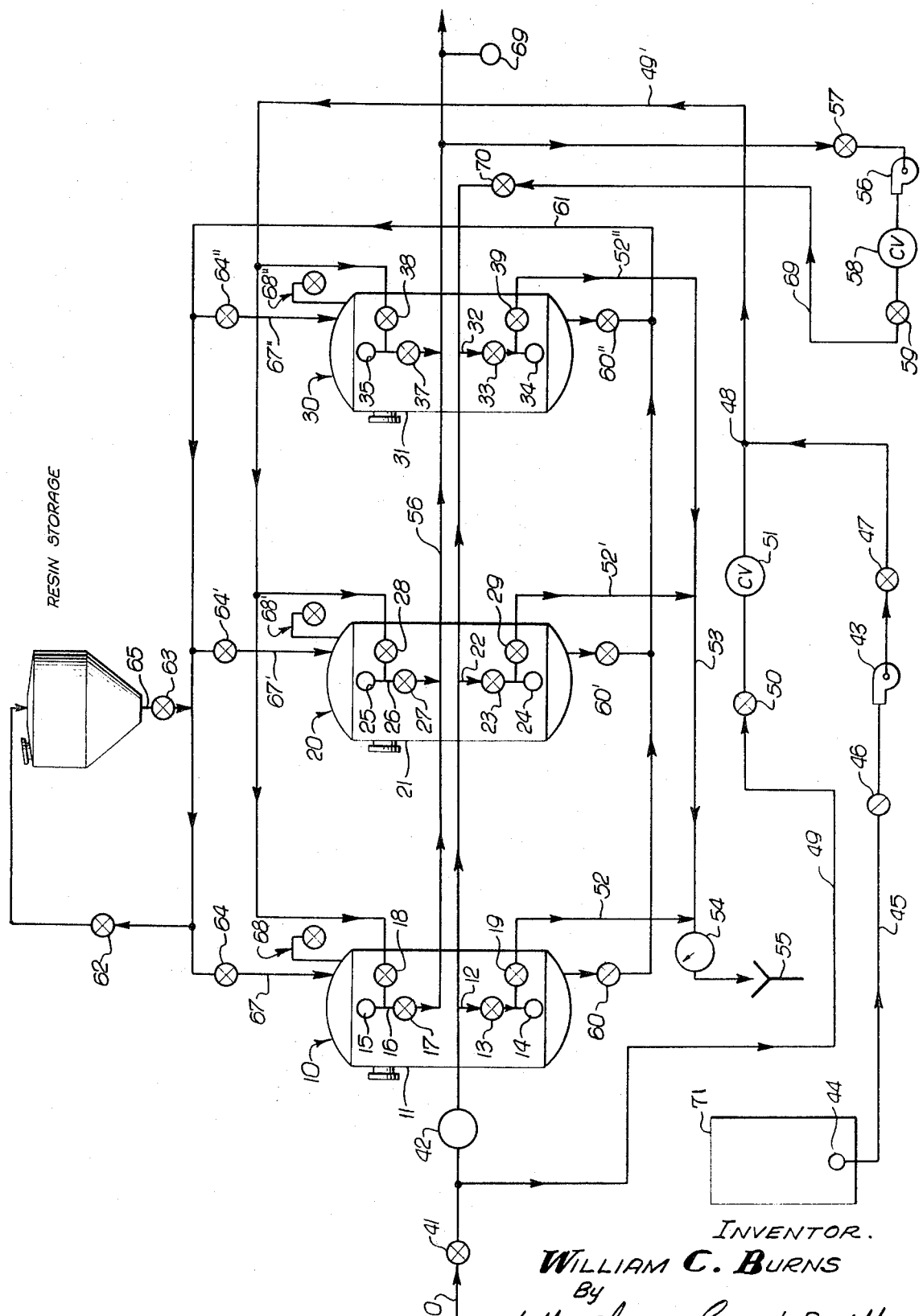

CONTINUOUS METHOD FOR TREATING LIQUIDS

BACKGROUND OF THE INVENTION

Water conditioning and treatment of solutions generally to remove undesirable ions has long been a problem but has become more serious in recent years as technology has become more complex. Treatment of solutions containing undesirable substances is now generally accomplished by the use of ion-exchange materials. Ion-exchange materials are considered to be of two types: cation exchangers and anion exchangers.

Cation exchangers contain easily exchangeable hydrogen ions and can be used to remove all cations contained in a liquid such as water. When the cation exchanger is exhausted it can be regenerated by an acid such as sulfuric acid or hydrochloric acid. Cation exchangers can also be regenerated by a salt solution such as sodium chloride, in which case they operate as ordinary water softeners.

The cation exchangers often produce acidic solutions which sometimes is not desirable. If demineralization of the effluent from the cation exchangers is required the effluent is passed through an anion exchange material. This dual treatment or two step process completely deionizes the water.

When the anion exchanger is exhausted it can be regenerated by an alkali solution such as $Na_2CO_3$ or NaOH.

One of the primary uses of ion-exchange material is in the softening of hard water. So-called hard water is that type of water which contains significant amounts of dissolved salts of calcium, magnesium and the like. Generally speaking, these salts are present as bicarbonates, sulfates, chlorides and/or nitrates. These salts are objectionable because, inter alia, they form insoluble precipitates with soap and, in addition, form scale on boilers and the like which causes clogging and also lowers the thermal conductivity.

As a general rule, the hardness of water is expressed in terms of the dissolved salts calculated as calcium carbonate. Very hard water may include up to 5,000 parts per million (p.p.m.) or higher whereas water which is considered soft may have only 2 to 5 p.p.m., expressed in terms of calcium carbonate content.

One of the primary and most important methods for softening water is the so-called ion-exchange method wherein hard water is passed through an ion-exchange material so that the ions causing hardness, e.g., calcium and magnesium ions, are removed from the water and replaced by other ions, such as sodium ions, contained in the ion-exchange material. One of the oldest ion-exhange materials, and still probably the most important, is zeolite which originally indicated a class of materials composed primarily of hydrated alumino-silicates containing easily exchangeable ions such as alkali and alkaline earth metals, e.g., sodium and potassium. However, now, this term also includes such diverse groups of compounds as sulfonated basic resins which effect either cation or anion exchange. As examples of such resins are sulfonated hydrocarbons of the styrene-base type such as Nalcite-HCR.

Typical equations utilizing ion-exchange material, particularly of the zeolite type, are:

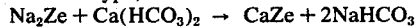
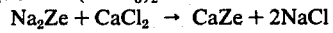

When all of the ions of the ion-exchange material have been replaced by ions contained in the water the ion-exchange material must be regenerated. This is normally accomplished by passing a salt solution such as sodium chloride through, and in intimate contact with, the ion-exchange material. The regeneration reaction may be exemplified as follows:

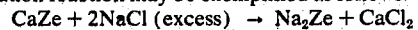

After the exhausted ion-exchange material has been regenerated it is necessary to remove the regeneration solution from said material by rinsing in order that the regeneration salt solution will not contaminate the softened water.

Because of the necessity to regenerate the ion-exchange material and, thereafter, to rinse same it has been the practice to utilize batch operations to soften water. For example, first the hard water would be softened and the softened water discharged from the system and, after the ion-exchange material had become exhausted, the flow of water through the ion-exchange material would cease until the ion-exchange material could be regenerated. This is very inconvenient and substantially raises the cost for softening water. Later there was developed a method utilizing a so-called moveable bed whereby after the ion-exchange material has been exhausted the material is moved to another tank where it is regenerated. This second method has many disadvantages among which is the high cost of operating same due to loss of ion-exchange material and the low output per unit of sectional area.

It is thus a desideratum in the art to embody a continuous method for producing treated water utilizing fixed beds or zones of ion-exchange material, i.e., without moving the ion-exchange material.

SUMMARY OF THE INVENTION

The primary object of the present invention, therefore, is to disclose and provide a continuous method for providing treated or deionized liquids utilizing fixed beds of ion-exchange material.

It is a further object of the present invention to embody a method for producing deionized water wherein three or more zones containing ion-exchange material are utilized, said zones being connected in series and at least one zone being utilized to deionize the water, at least one zone being utilized to regenerate the exhausted ion-exchange material, and at least one zone being utilized to rinse the regenerated ion-exchange material, at least three of the zones being operated simultaneously.

It is still another object of the present invention to disclose and provide a continuous method for producing treated water wherein a portion of the treated water is utilized to rinse ion-exchange material of regeneration solution, although it should be emphasized that a raw water can also be utilized to rinse the ion-exchange material.

The foregoing objects, and others, are accomplished by the present invention which, generally stated, comprises the provision of a continuous method for producing soft water by utilizing at least three zones in a continuous manner, said zones containing ion-exchange material, at least one zone being utilized as a treating unit, at least one zone being utilized for regenerating exhausted ion-exchange material, and at least one zone being utilized for rinsing regeneration solution from the ion exchange material. When the ion exchange material contained in the zone being utilized to treat the water is exhausted the raw water is transferred to the zone containing newly rinsed ion-exchange material and the original treating zone is then regenerated by passing regeneration solution therethrough in intimate contact with the ion-exchange material. At the same time, a third zone is being rinsed of regeneration solution by passing rinse water through the zone in intimate contact with the ion-exchange material contained therein.

BRIEF DESCRIPTION OF THE DRAWING

The drawing is a flow sheet of a system comprising three zones containing ion-exchange material in accordance with the present invention.

DESCRIPTION OF THE PREFERRED EMBODIMENTS

The drawing somewhat diagrammatically represents a complete system for treating a continuous flow of hard water to provide a continuous discharge of soft water. In the preferred exemplary embodiment three zones are utilized, indicated generally at 10, 20 and 30, said zones consisting, inter alia, of container means which, in the preferred embodiment, are cylindrical tanks 11, 21 and 31 of selected height and diameter connected in series by piping means explained in greater detail infra.

In the preferred exemplary embodiment, cylindrical tanks 11, 21 and 31 contain ion-exchange material such as zeolite, preferably a high capacity polystyrene cation resin available and sold under the names of Nalcite HCR-W and Amberlite IR-120. In order to allow for expansion and contraction of the ion-exchange material there is a freeboard space in each of the cylindrical tanks 11, 21 and 31. This freeboard space is only about 6 inches depending on the depth and diameter of the ion-exchange material in the tanks. In addition, each tank has air escape means indicated generally at 68, 68' and 68''.

In basic operation, the method of this invention utilizes the three cylindrical tanks 11, 21 and 31. Initially, tank 11 is a service or treating tank wherein hard water enters the system via inlet line 40 and through valve 41 which can be opened and closed to control the flow of water, the flow being measured by flow totalizer 42. The water enters the bottom of tank 11 via inlet service line 12 and through inlet service valve 13 which is in the open position when tank 11 is in the service cycle. Outlet regeneration valve 19 during the service cycle is in the closed position. In tanks 21 and 31, inlet service valves 23 and 33 are in the closed position, when tank 11 is in the service cycle, so as to prevent influent water from entering service inlets 24 and 34 via inlet service lines 22 and 32. The influent water entering service inlet 14 in tank 11 flows upwardly through tank 11 at a flow rate of between 15 gallons per minute (g.p.m.) to 50 g.p.m. per square foot of bed area. At these flow rates, the ion-exchange material contained in tank 11 will be wedged against the upper end of the tank which prevents mixing of the ion-exchange material. The softened water then leaves tank 11 through service outlet 15 via outlet service line 16 and outlet service valve 17 which is in the opened position. The softened water then leaves the system via line 56. The amount of cation in the softened water is measured by cation meter 69.

At the same time the service cycle is being conducted in tank 11, tank 31 which, in the consideration of this example, may contain exhausted ion-exchange material being regenerated by passing regeneration solution therethrough in intimate contact with the ion-exchange material. The regeneration solution, e.g., an aqueous solution of sodium chloride, is contained in regeneration storage tank 71. When using this regeneration solution, pump 43 is started and the regeneration solution is pumped out of regeneration storage tank 71 through outlet 44 located in the bottom of tank 71 and via line 45 through valves 46 and 47 and thence through line 49' to tank 31. If necessary, the regeneration solution can be mixed with raw influent water at mixing-T 48, the raw water entering via line 49 and thence through valve 50 which, when it is desired to mix water with the regeneration solution, is in the open position. In order to prevent regeneration solution from backing up through line 49, one-way valve 51 is provided.

The regeneration solution enters tank 31 through service outlet 35, inlet regeneration valve 38 being in the open position and outlet service valve 37 being closed. In order to prevent regeneration solution from entering tanks 11 and 21, inlet regeneration valves 18 and 28 are in the closed position.

The regeneration flows downwardly through tank 31 in intimate contact with the ion-exchange material contained therein and out of tank 31 via service inlet 34 and through outlet regeneration valve 39 which is in the open position. The regeneration solution then continues through line 52'', to line 53, through flow meter 54 and then out of the system via sewer 55. Regeneration solution is passed through tank 31 until the exhausted ion-exchange material is regenerated.

The regenerated ion-exchange material which contains residual amounts of regeneration solution can either be rinsed with hard influent water or with softened water obtained from the tank being utilized as the service tank. In this example, tank 21 is considered as being in condition for rinsing, tank 21 having just previously been regenerated. A substantial portion of the softened water in line 56 from tank 11 passes out of the system; however, a minor portion is bypassed into the top of tank 21 through service outlet 25 via outlet service line 26 when outlet service valve 27 is opened. This rinse water is then passed downwardly through tank 21 in intimate contact with ion-exchange material and passes out of tank through service inlet 24 when outlet regeneration valve 29 is open and thence through line 52' 40 line 53 and out of the system via sewer 55.

When the ion-exchange material contained in tank 11 is exhausted, inlet service valve 13 is closed and inlet service valve 23 in tank 21 is opened to allow the hard water to flow upwardly through tank 11. The softened water then leaves tank 21 through service outlet 25 in the same manner as described with respect to tank 11. At the same time inlet regeneration valve 28 in tank 21 is closed to prevent regeneration solution from entering tank 21. Concurrently with the closing of inlet regeneration valve 28, inlet regeneration valve 18 is opened in tank 11 so that regeneration solution from regeneration storage tank 42 may enter tank 11 via service outlet 15, the regeneration solution passing downwardly through tank 11 in intimate contact with the ion-exchange material contained therein and thence out of tank 11 through service inlet 14, outlet regeneration valve 19 being in an opened position. The regeneration solution then leaves the system through line 52 and line 53 and is disposed of in sewer 55.

Concurrently with the above operations, outlet service valve 27 is closed in order to prevent rinse water from entering tank 21 from line 56 and, at the same time, outlet service valve 37 in tank 31 is opened to allow a certain portion of the softened water from tank 21 to enter service outlet 35 and pass downwardly through tank 31 rinsing the ion-exchange material contained therein.

The same procedure is followed when the ion-exchange material contained in tank 21 is exhausted. Tank 31 then becomes the service tank, tank 11 becomes the regeneration tank, and tank 21 becomes the rinsing tank. Thus, regeneration pump 43 is running at all times and a small amount of rinse water is going to sewer 55 at all times. This is a great advantage in that the waste system is only required to handle a steady but very small amount of waste product. End points of the various columns are always double-checked with various detectors, not shown, even though the prime cycling of the units is done on a time bases.

In those rare instances when soft water is not needed a recirculation pump 56 is provided to recycle softened water through the system. When this occurs recirculation valve 57 is opened, recirculation pump 56 is started so the softened water flows through one-way valve 58 and valve 59 and then through line 69 and valve 70 therein to the particular tank which is in the service position. It is necessary to keep a minimum flow in the service tank in order to insure that there is no leakage or channeling in the service tank.

Also provided in the system is a resin storage container which is utilized for charging the units initially and to have a convenient place to put the ion-exchange material contained in tanks 11, 21 and 31 in the event of mechanical failure. In order to transfer the ion-exchange material from tanks 11, 21 and 31 to the resin storage container, valves 60, 60' and 60'' are opened and the ion-exchange material is allowed to flow out of the cylindrical tanks to the storage unit via line 61 and through valve 62 which is in the open position. To reverse the process valves 60, 60', 60'' and 62 are closed and valves 63, 64, 64' and 64'' are opened and the ion-exchange material from the storage unit is allowed to flow into the upper portions of the cylindrical tanks through line 65 and thence into lines 67, 67' and 67''.

In the practice of the continuous method of continuously performing service, regeneration, and rinse operations in a series arrangement of at least three reactors, the influent raw water is preferably prefiltered so as to be relatively clean with respect to suspended matter so that possible fouling of the resin bed will be minimized. Upflow of clean raw water through the resin bed causes the resin particles at the bottom of the bed to be exhausted to a greater degree than resin particles at the top of the bed. Downflow regeneration thus regenerates the least exhausted top resin particles first and the most exhausted bottom resin particles in a zone where the regeneration solution is quickly discharged from the bed and tank. The regeneration solution is also rinsed by downflow of the rinsing water. In this system, it should be noted that backwashing of the bed in preparation for regeneration is not done, the bed is permitted only minimum normal expansion and contraction from regenerated to unregenerated conditions in the relatively limited freeboard space, migration of resin particles is limited, and as a result, high chemical efficiency of exchange of ions is achieved. Further, as a result of maintaining a relatively minimum normal expansion resin bed together with absence of backwashing, chemical dosage costs and maintenance are suppressed.

Since the regeneration pump is running all the time and a small amount of rinse water is being discharged to the sewer, the sewer is required to only handle a steady relatively small flow and the possibility of leakage or channeling of the resin bed is reduced.

The embodiment described supra exemplified a method for softening water utilizing a zeolite softener. It should be emphasized however that my invention can utilize any type of ion-exchange material, i.e., an anion exchanger, a cation exchanger or both, depending on the particular liquid being treated, the ions contained in said liquid, and how the liquid is to be utilized. When an ion-free liquid is desired, the influent liquid can be treated as described above utilizing a cation exchanger as the ion-exchange material and the effluent liquid can be passed through an anion exchanger in the same manner.

It will be understood that the foregoing description is only illustrative of the present invention and it is not to be limited thereto. Many other forms of apparatus, compositions, flow rates, etc., will be apparent to the skilled in the art and all substitutions, alterations, and modifications of the present invention which come within the scope of the present claims or to which the present invention is readily susceptible without departing from the spirit and scope of this disclosure are considered a part of the present invention.

I claim:

1. A continuous method for treating water containing ions by continuously and successively utilizing at least three fixed zones of ion-exchange material to provide a continuous discharge of treated water, each fixed zone of a freeboard space at the top thereof, which comprises:
    a. introducing influent water at the bottom of a first fixed zone of ion-exchange material and passing said water upwardly through said first zone in intimate contact with said ion-exchange material, the pressure order of the influent water being sufficient to force and hold the ion-exchange material against the top of the zone and in the freeboard space (NOT)-AND (NOT)-AND thereby preventing said ion-exchange material from mixing and producing a treated water by replacing ions from the ion-exchange material with ions in the influent water and withdrawing the treated water from said zone;
    b. introducing rinse water substantially free of suspended matter to a second fixed zone of regenerated ion-exchange material and passing said rinse water through said second zone in intimate contact with said ion-exchange material rinse said ion-exchange material without a back washing thereby substantially preventing migration of the ion-exchange material, and disposing of the contaminated rinse water;
    c. regenerating a third fixed zone of substantially exhausted ion-exchange material by passing downwardly through said third zone a regeneration solution until said ion-exchange material is substantially regenerated;
    d. discontinuing introduction of influent water into said first zone and introducing said influent water into the bottom of the regenerated and rinsed second zone after the ion-exchange material of said first zone has become substantially exhausted and passing said influent water upwardly through said second zone in intimate contact with said ion-exchange material, the pressure of the influent water being sufficient to force and hold the ion-exchange material against the top of the zone an in the freeboard space thereby preventing said ion-exchange material from mixing and producing a treated water by replacing ions from the ion-exchange material with ions in the influent water and withdrawing the treated water from said second zone;
    e. introducing rinse water substantially free of suspended matter to a third fixed zone of regenerated ion-exchange material and passing said rinse water through said third zone in intimate contact with said ion-exchange material to rinse said ion-exchange material without back washing thereby preventing migration of the ion-exchange material, and disposing of the contaminated rinse water;
    f. regenerating said first zone containing substantially exhausted ion-exchange material by passing downwardly through said first zone a regeneration solution until said ion-exchange material is substantially regenerated; and
    g. discontinuing introduction of influent water into said second zone and introducing said influent water into the bottom of the regenerated and rinsed second zone after the ion-exchange material of said first zone and become substantially exhausted and passing said influent water upwardly through said second zone in intimate contact with said ion-exchange material, the pressure of the influent water being sufficient to force and hold the ion-exchange material against the top of the zone and in the freeboard space thereby preventing said ion-exchange material from mixing and producing a treated water by replacing ions from the ion-exchange material with ions in the influent water.

2. A method according to claim 1 wherein the flow of influent water upwardly is between about 10 gallons per minute per square foot and 50 gallons per minute per square foot.

3. A method according to claim 1 wherein the rinsing of the ion-exchange material is conducted downwardly through said ion-exchange material.

4. A method according to claim 1 wherein the regeneration solution is a solution of sodium chloride.

5. A method according to claim 1 wherein the ion-exchange material is a cation exchange resin.

6. A method according to claim 5 wherein the ion-exchange material is zeolite.

7. A method according to claim 6 wherein the influent water is hard water containing ions causing hardness.

* * * * *